Jan. 24, 1967  G. BENOIT ET AL  3,300,752
ELECTRICAL CONNECTORS
Filed June 2, 1964  3 Sheets-Sheet 1
FIG.1
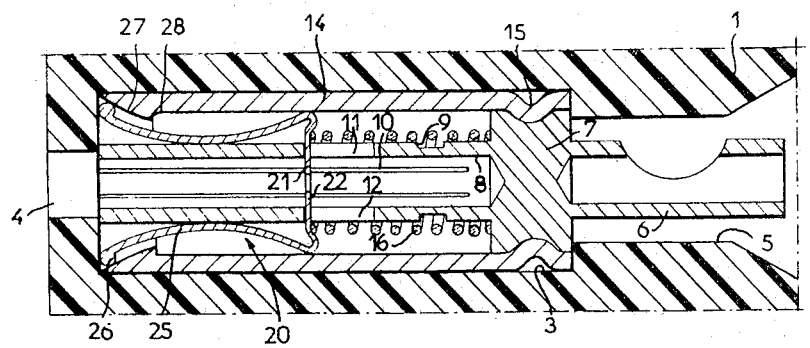
FIG.2
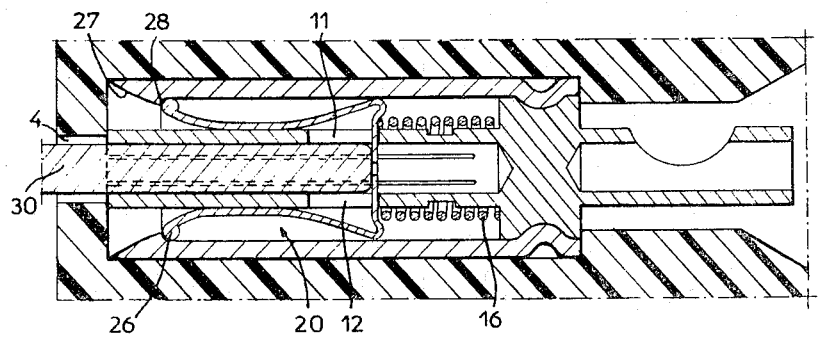
FIG.3
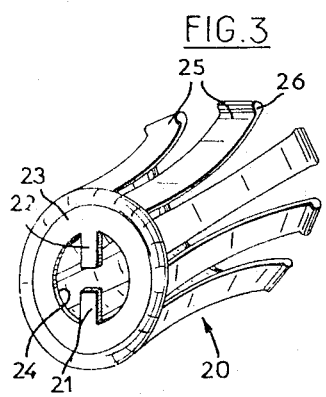
FIG.4
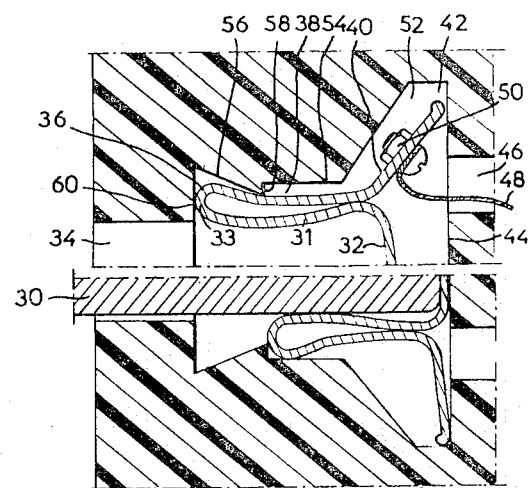
FIG.5
Inventors:
Gérard Benoit, Ferdy Mayer,
Franz Mayer, Pierre Thomas
By: Spencer & Kaye
ATTORNEYS

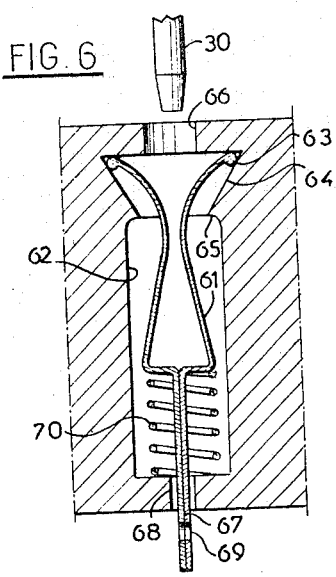
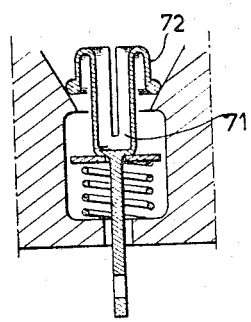
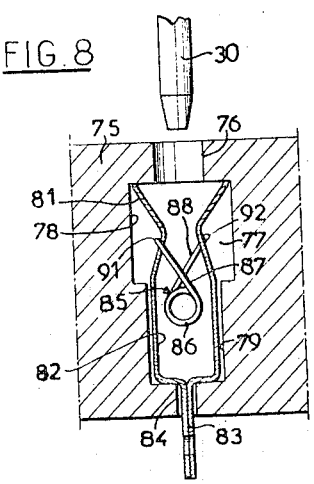
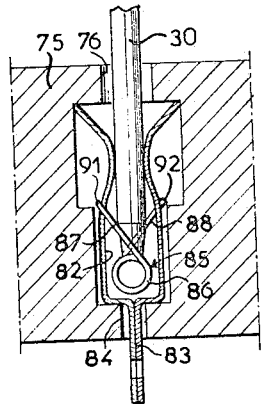
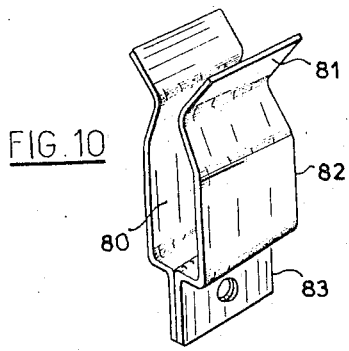
Inventors:
Gérard Benoit
Ferdy Mayer
Franz Mayer
Pierre Thomas
By: Spencer & Kaye
ATTORNEYS

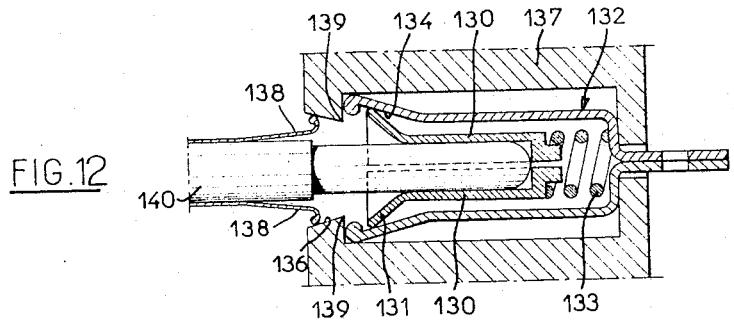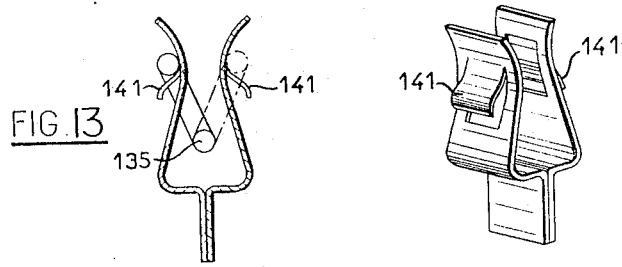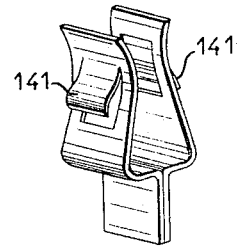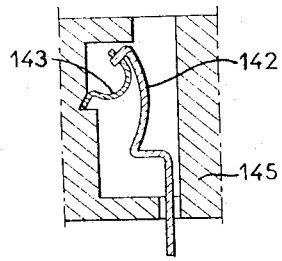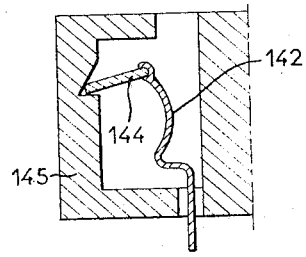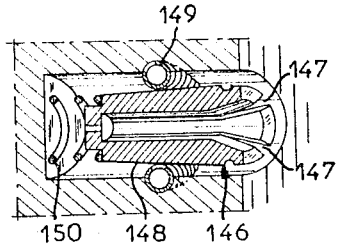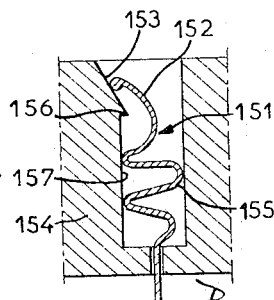

United States Patent Office 3,300,752
Patented Jan. 24, 1967

3,300,752
ELECTRICAL CONNECTORS
Gerard Benoit, 6 Rue du Cirque, Paris, France; Ferdy Mayer, 22 Rue Ampere, Grenoble, France; Franz Mayer, 6 Rue du Cirque, Paris, France; and Pierre Thomas, 2 Rue Charles Gounod, Grenoble, France
Filed June 2, 1964, Ser. No. 371,905
Claims priority, application France, June 24, 1963, 939,143
9 Claims. (Cl. 339—253)

The present invention relates to field of electrical connectors and more particularly to electrical plug sockets of the elastically deformable type.

It is a primary object of the present invention to assure in an electrical circuit, a positive contact between a plug and a socket.

It is another object to achieve such a contact through the action of the pressure applied to insert said plug into said socket.

It is still another object of the present invention to provide mechanically simple receptacles which apply a positive lateral force to their mating plugs, the application of said force being triggered by the insertion of the plug.

Yet another object of the present invention is to provide a more forceful contact than that which is obtainable in the prior art spring contact devices.

Briefly stated, the present invention contemplates the provision of socket members made of an elastically deformable material and associated with other elements which permit it to pass from an open state to a closed state, this passage being produced by the longitudinal pressure exerted by the insertion of a mating plug.

This arrangement thus permits the simple act of inserting a plug to automatically produce a tight gripping action by the socket, thus assuring a connection which is extremely solid, both electrically and mechanically. Such a device also permits plugs having various sizes and shapes to be firmly held in the socket.

The insertion of the plug can be accompanied either with or without a sliding contact of the plug with the socket and, in either case, will be terminated by the movement of the socket into a stable "locking" position.

In the various embodiments of the present invention, the locking assembly may comprise either a camming surface or an inclined plane which acts in cooperation with an axially movable gripping unit.

The inclined plane, which produces a progressive closing action, is terminated by a locking means constituting a final locking abutment, either directly or through the intermediary of a locking notch.

Other advantages, characteristics and features of the present invention will become apparent from the illustrative examples described in the following description and shown in the accompanying drawings, in which:

FIG. 1 shows a longitudinal cross sectional view of one embodiment of the connector of the present invention;

FIG. 2 shows the same view as FIG. 1, with the connector in its locked condition;

FIG. 3 is a perspective view of elastic locking element of FIGS. 1 and 2;

FIG. 4 is a longitudinal cross-sectional view of one-half of another embodiment of the socket of the present invention in its unlocked state;

FIG. 5 is a longitudinal cross-sectional view of one-half of the embodiment of FIG. 4 in its locked position;

FIG. 6 is a longitudinal cross-sectional view of a further embodiment of the present invention;

FIG. 7 is a longitudinal cross-sectional view of a detail of a variation of the connector shown in FIG. 6;

FIGS. 8 and 9 are longitudinal cross-sectional views of the open and closed states, respectively, of still another embodiment of the present invention;

FIGS. 10 and 11 are perspective views of the elastic elements of the embodiment of FIGS. 8 and 9;

FIG. 12 is a longitudinal cross-sectional view of still another embodiment of the present invention;

FIG. 13 is a cross-sectional side view of a variation of the embodiment of FIG. 8;

FIG. 14 is a perspective view of the plug engaging element of FIG. 13;

FIGS. 15 and 16 represent alternate forms of a still further embodiment of the present invention;

FIG. 17 shows a detail of a variant of a portion of the connector of FIG. 16;

FIG. 18 is a perspective view, in cross-section, of yet another embodiment of the present invention;

FIG. 19 is a longitudinal cross-sectional view of an additional embodiment of the present invention; and FIG. 20 is a longitudinal cross-sectional view of a modification of the embodiment of FIG. 19.

FIGS. 1 to 3 show one preferred embodiment of the present invention in which a casing 1 is made of an electrically isolating material and is formed in two separable halves which are joined, in FIGS. 1 and 2, along a horizontal plane which is perpendicular to the plane of the drawings. The casing defines a series of cylindrical socket housings which are in line with one another, said series extending along said horizontal plane. One of these housings is shown in cross-section in FIGS. 1 and 2 and comprises a cylindrical cavity 3 extending between a small access opening 4 for receiving a plug and a rear opening 5 for receiving a connecting wire (not shown) which will be inserted into, and soldered to, the solder terminal 6, which is formed as a projection on the rear base of a piece 7. The piece 7 also comprises a hollow projection 8 which extends from its frontal base axially across the cavity 3 to form a plug socket. The projection 8 has a circular groove 9 formed on its outer surface and a series of longitudinal slits 10 space around its periphery and extending to its forward base, i.e., the end in communication with access opening 4. These slits cause the socket 8 to be radially elastically deformable over its forward portion. The socket 8 also has, in the region midway between its ends and forward of the groove 9, a pair of diametrically opposed openings 11 and 12 cut into its surface to serve as guides for the tabs 21 and 22 of the deformable element 20 (see FIG. 3), tabs 21 and 22 serving as control means and being disposed in the path of travel of a plug to be inserted through the opening 4. Element 20 comprises a circular base 23 in the circular opening 24 of which are formed said inwardly extending guide tabs 21 and 22. The opening 24 is designed to permit the base 23 to slide along the surface of socket 8. Connected around the periphery of base 23 are a plurality of strips 25, each of which is in the form of an arched leaf spring terminating in a fillet 26. Strips 25 and fillets 26 constitute the second portion of socket deforming means and are operatively associated with socket 8 for elastically deforming the socket into a position where it tightly grips an inserted plug. When the part 20 is mounted in the unit of FIGS. 1 and 2, the convex surfaces of springs 25 bear against the outer surface of the forward portion of socket 8 and the fillets 26 bear against the camming surface 27 which acts as a first portion of the socket deforming means and which is stationary with respect to the socket housing. The surface 27 has a radius which progressively decreases towards the rear of cavity 3, the inner end of the surface terminating at a locking notch 28 which serves as a locking means positioned to cooperate with the second portion of the socket deforming means. The unit on which the camming surface 27 is formed consists of a longitudinal sleeve 14 lodged in the cavity 3 and having its rear portion firmly crimped around the socket carrying pieces 7 so as to prevent any longitudinal movement of the latter. The deformable element 20 is urged into a normally open position, where fillets 26 will rest on the forward portion of surface 27, by elastic restoring means constituted by a compressed spiral spring 16 wrapped around the outer surface of the rear portion of socket 8 and compressed between the frontal base of piece 7 and the locking element base 23.

Referring particularly to FIG. 2, in which the unit is shown to have a plug 30 inserted through opening 4, it may be seen that the act of insertion causes the leading end of the plug to first engage the control means constituted by tabs 21 and 22 and to then move the entire unit 20 towards the rear of cavity 3 (to the right in FIGS. 1 and 2), thereby compressing spring 16 and causing fillets 26 to slide rearwardly along surface 27. This movement of the fillets produces a progressive radial compression of the springs 25, which in turn induces an inward radial deflection of the longitudinal elements of socket 8. This action continues until the tabs 21 and 22 reach the rear ends of openings 11 and 12, respectively, at which time the fillets 26 are engaging locking notch 28. At this point the pressure exerted by springs 25 causes the socket 8 to grip plug 30 with a firm positive pressure which serves to insure an extremely good electrical and mechanical contact. The socket is prevented by locking notch 28 from ejecting the plug, the plug itself exerting a radial pressure to maintain the fillets in engagement with the notch. It should be noted that even if the inner surface of socket 8 should become worn during its life, the positive radial force produced by springs 25 will continue to insure a good contact. Accidental dislodgement of the plug is inhibited by the fact that a certain minimum extraction pressure must be exerted before the holding pressure of socket 8 is overcome. The extraction of the plug 30 removes the principal force holding the fillets in notch 28 and compressed spring 16 drives element 20 back towards its normally open position.

In the embodiment shown in FIGS. 4 and 5, in which FIG. 4 shows the upper half of the device in its open state and FIG. 5 shows the lower half in its locked state, the functions of the socket 8, deformable element 20, and restoring spring 16 of FIGS. 1 and 2 are performed by various portions of a single, elastically deformable, electrically conductive piece having an appropriate cross-section, as shown in FIGS. 4 and 5, and having an indefinite length perpendicular to the plane of the drawings.

The profile of the deformable element comprises a central portion 31 forming a canal which is designed to act as a female contact element, or socket. This portion 31 extends between an axially centered base portion 32 constituting the control means for the device and a frontal portion 33, the last named portion being disposed near the top and the bottom of a plug access opening 34. This opening is in the form of a continuous slot of indefinite length which extends into the plane of the paper for an extent equal to that of the above described deformable piece.

Adjacent frontal portion 33, the unitary piece is folded back at 36 to form a support portion 38 which is co-extensive with section 31, the portions 38 and 31 being spaced very close to one another. The portion 36 and the front of portion 38 together constitute the second portion of the socket deforming means of this embodiment. The rear of portion 38 is adjacent a supporting leg portion 40 which extends laterally outward and which is terminated by a lip 42 which bears against the base 44 of the housing. It should be noted that each portion enumerated in connection with FIG. 4 has its corresponding member on the lower half of the element, i.e., that half shown in FIG. 5.

The base 44 has at least one opening 46 to permit the insertion of a connecting wire 48 and the leg portion 40 has at least one connector of the permanent type, such as a nut and bolt 50, for attaching the wire 48 to the deformable element.

The housing comprises, starting from base 44, a widened, or bell shaped portion 42, a section 54 of unvarying thickness terminated at its front end by a locking notch 58 constituting the locking means of this device and a camming ramp 56 which constitutes the first portion of the socket deforming means of this device. The forward end of ramp 56 is terminated by a retaining abutment 60 against which the forward portions 33, 36 of the deformable element rest when the unit is in its normally open condition.

When a plug 30 is inserted through opening 34, as shown in FIG. 5, it advances easily until abutting against the control means constituted by base portion 32. As the insertion continues, the forward portion of the plug contacts portion 31 of the female element and the leading face of the plug moves base 32, and canal portion 31, towards the rear of the housing, causing support portion 38 to slide backwards over the ramp 56 and contact portion 31 to grip plug 30. This action continues until leg portion 40 has spread outward to a point where lip 42 is prevented by the housing from further outward movement, at which time the forward folded portion 36 of the deformable element engages, and is retained by, locking notch 58.

When the plug is removed, the unit resumes the position shown in FIG. 4, the leg portion 40 acting as an elastic restoring means and providing the necessary restoring spring action.

It should be particularly noted that the embodiment shown in FIGS. 4 and 5 is capable of receiving several plugs spaced along its length (perpendicular to the plane of the figures). Since the female connector element is made of a flexible material, the insertion of one plug will produce a deformation only along a portion of its length. Therefore, a separate clamping action will be induced by the insertion of each plug, provided the plugs are spaced far enough apart along the length of the deformable receptacle.

Turning now to FIG. 6, there is shown a female connecting element, or socket, 61 disposed within the cavity of housing 62 and terminated by a pair bearing fillets 63 constituting a part of the second portion of the socket deforming means of this embodiment.

This cavity is also defined by a pair of inclined contact-closing planes 64, each of which cooperates with a respective one of the fillets 63, the planes constituting the first portion of the socket deforming means of this embodiment and being terminated at their inner ends by locking notches 65 constituting locking means and at their outer ends by an abutment in which is provided an opening 66 for admitting a connector plug 30. The female connector 61 is constituted in this embodiment by a symmetrical pair of elastically deformable elements having an appropriate configuration and having their rear portions 67 abutting and permanently connected together to cause the two halves of the connector to define a unitary element. The rear portions 67 contain a transverse opening 69 for the insertion and soldering to the connector of current-carrying wire (not shown), the portions 67 extending through an opening 68 arranged in the rear of housing 62 to permit the opening 69 to be outside of the housing. A compressed spiral spring 70 is provided in the housing cavity, between the rear face of the cavity and the portion of connector 67 which defines the base, or control means, of the female connector, for urging the connector towards the front of the housing. Spring 70 thus serves as the elastic restoring means for this device.

It should be noted that such an embodiment could also be modified to have a circular female connector having an axial stem.

In the variation shown in FIG. 7, a split cylindrical socket member is furnished with a certain number of feet 72 which are folded backward from the leading edge of the plug receiving portion and which constitute the second portion of the socket deforming means of this device.

FIGS. 8–11 show still another embodiment of the present invention in which a housing 75 contains a cylindrical plug receiving opening 76 in communication with a cavity 77 comprising a larger portion 78 and a smaller portion 79, said portions 78 and 79 each having a rectangular base. A female plug element, held in said cavity 77 in an axially immovable manner, consists of an assemblage of two elastically deformable members 80, each comprising an arched forward portion 81, a body 82 terminated by a right-angle bend, and a stem 83 passing through an opening 84 cut in the rear base of the housing in axial alignment with opening 76.

The means for producing a closing action of the female socket are constituted by a spring 85 of the clothes pin type. Such a spring may comprise a spiral torsion spring element 86 terminated at respective ends by arms 87 and 88 extending at right angles to the axis of portion 86, the ends of the arms themselves being bent at right angles to form respective, mutually parallel bearing arms 91 and 92. The action of the spring is such as to force the arms 91 and 92 towards each other. As is clearly shown in FIGS. 8 and 9, this spring is arranged so that arms 91 and 92 of spring 85 bear against the outer, concave, surfaces of the arched portions of respective members 80 and so that spring portion 86 will be engaged by the leading edge of an inserted plug 30.

When plug 30 is inserted, it moves forward until abutting against spring portion 86. Continued insertion forces portion 86 towards the rear of the housing, causing the arms 91 and 92 to slide rearwards along their respective bearing surfaces, thus forcing elements 81 together into a plug-gripping position.

The extent of the plug insertion can be limited by the abutment either of the spring portion 86 against the base of the female socket or of the arms 91 and 92 against the shoulders defining the boundary between the portions 78 and 79 of cavity 77. When the plug is withdrawn, the inclined surfaces of socket portions 8 produce a camming action which tends to move the spring unit 85 back to its rest position, as shown in FIG. 8, the return movement producing a progressive opening of the female connector 80.

Turning now to FIGURE 12, there is shown an embodiment having a socket comprised of two rigid shells 130, preferably semi-circular in shape, having frontal portions 131 which form the plug receiving opening of the socket, said shells being disposed in an axially movable manner in an elastic pincer 132, and bearing longitudinally against a restoring spring 133. The forward portion 134 of the pincer 132 is bent outwardly to form the socket closing ramp. The opening 136 in housing 137 has an outwardly opening frusto-conical shape, the inner end of which terminates on locking notch 139 for the leading edges of spring blades 138, the latter being joined to the wall of plug 140.

Upon insertion, the plug 140 will slide easily into socket 130 until reaching the bottom thereof. The plug and socket will then slide together towards the rear of the cavity, with the ramp 134 producing a progressive closing of the socket, until the springs 138 lock into the notches 139. The plug is released by pressing radially inwardly on blades 138.

FIGS. 13 and 14 illustrate a variation of the embodiment shown in FIG. 8. The closing element 135 is simplified due to the fact that it is a rigid element. This unit 135 has parallel arms which bear against respective, laterally extending, flexible branches 141 which form ramps for urging the socket into a plug gripping condition.

FIGS. 15 and 16 show variations of abrupt closing connectors in which only one laterally deformable element 142 is used to form the socket. The insertion of a plug causes this element to close abruptly due to the lateral force applied by the rotation either of a curved spring element 143, as shown in FIG. 15, or of a rigid rod 144, as shown in FIG. 15. The elements 143 and 144 are hinged to the housing 145 so as to rotate freely with respect thereto. In addition, the element 143 is rigidly fastened to its socket element 142, while element 144 is slidably joined to rotate with respect to its element 142. FIG. 17 shows still another variation of this embodiment wherein the rigid rod is hinged to the socket element.

FIG. 18 shows an embodiment in which the socket 146 presents the general shape of a tulip; i.e., it comprises a cylindrical array of longitudinal strips of radially deformable material separated from each other by cuts 147 and connected together at the rear by a circular base member constituting a control means for the device. The outer cylindrical surface 148 of the socket is in the form of a cone which has an increasing radius towards the open end of the socket to form a closing ramp which constitutes the second portion of the socket deforming means of this embodiment. The element for urging the socket into a closed condition is an annularly disposed spiral spring 149 which encircles the socket and which is immovably held in an appropriate recess in the socket casing, spring 149 constituting both the locking means and the first portion of the socket deforming means and being arranged to engage in an annular groove formed in the outer surface of socket 146 near the plug-receiving end thereof. The elastic restoring means for urging the socket into its normally open condition comprises a spring 150 compressed between the base of the socket and the bottom of the cavity in which it is disposed.

The embodiment of FIG. 19 comprises a socket element 151, the forward portion 152 of which constitutes part of the second portion of the socket deforming means of this device and bears against, and acts in cooperation with a ramp 153 formed in the housing 154 and constituting the first portion of the socket deforming means. The rear portion 155 of the socket element 151 includes the socket control means and is folded several times to form a series of undulations which constitute the elastic restoring means for urging the element into its normally open position. The inner end of ramp 153 terminates on a locking notch 156 which is followed by a longitudinal portion 157 having no incline with respect to the direction of longitudinal movement of the socket element.

FIG. 20 illustrates an embodiment which is generally similar to that of FIG. 19. However, in FIG. 20 no locking notch is shown between ramp 160 and longitudinal portion 161, and the socket opening means comprises a separate spiral spring 164 disposed around a rigid stem portion 162 of socket element 163. In this embodiment, the locking of an inserted plug could be achieved by means similar to those shown in FIG. 12, or by any other appropriate means.

The manner of operation of these last described embodiments is similar to that of the embodiments described earlier in the specification.

It is interesting to note that several of the embodiments described herein, in particular that of FIGS. 4 and 5, could advantageously be used in the construction of electrical outlet systems for the home, especially for room baseboards where it is desired to have a continuous plug receptacle extending horizontally along the wall.

The specific embodiments shown herein are only intended to serve as examples of the possible forms which the present invention may take and should not be considered to be limitative of its scope. It is intended that this invention be limited only by the breadth of the appended claims.

What we claim is:
1. An electrical connector comprising, in combination:
(a) a housing having a cavity formed therein, which cavity is formed so as to be in communication with the region outside of said housing;
(b) at least one socket, which is elastically deformable in a transverse direction, disposed in said housing cavity for receiving a plug to be inserted in a longitudinal direction in said socket;
(c) elastic restoring means associated with said socket for normally maintaining it in a condition in which it offers substantially no friction resistance to the insertion of the plug;
(d) socket deforming means having a first portion which is stationary with respect to said housing and a second portion which is movable in a longitudinal direction with respect to, and in sliding contact with, said first portion, said second portion being operatively associated with said socket for elastically deforming said socket transversely into a position where it tightly grips the inserted plug;
(e) at least one control means disposed within said housing cavity and connected for longitudinal movement with said second portion of said socket deforming means, said control means being disposed in the path over which the plug will travel when it is being inserted in a longitudinal direction into said socket to be moved longitudinally by the plug at least during the latter portion of its insertion travel, this movement of said control means operating to cause said second portion of said socket deforming means to deform said socket transversely into said position where it tightly grips the plug; and
(f) locking means positioned to cooperate with said second portion of said deforming means for retaining said second portion of said deforming means in the position where it causes said socket to tightly grip the plug, and to maintain a substantially constant gripping pressure on the plug, after the plug has been fully inserted and until the plug has been substantially completely withdrawn from contact with said socket, said locking means applying to said second portion of said deforming means a longitudinal restraining force which, until the plug has been completely withdrawn from contact with said socket, is greater than the combined opposing longitudinal force exerted by said restoring means and by the plug when it is being withdrawn from said socket.

2. Electrical connector as recited in claim 1, wherein said socket has a conical surface over at least a portion of its length which defines said second portion of said socket deforming means, and said first portion of said socket deforming means comprises an annular spring which encircles at least part of said conical portion of said socket.

3. Electrical connector as recited in claim 1, wherein said first portion of said socket deforming means is composed of a camming surface which cooperates with said second portion of said socket deforming means.

4. Electrical connector means as recited in claim 3, wherein said camming means is formed in the walls of said cavity as an inclined plane extending from the region where said cavity communicates with the region outside said housing to the inner portion of said cavity.

5. Electrical connector as recited in claim 4, wherein the portion of the cavity wall along which said inclined plane meets the inner portion of said cavity is shaped in the form of a stopping notch which constitutes said locking means.

6. Electrical connector as recited in claim 4 wherein: said socket is generally cylindrical in shape and has its longitudinal axis aligned with the portion of said cavity which is in communication with the region outside of said housing, the end of said socket which is closer to said last-named cavity portion being referred to as the forward end, said socket having a plurality of longitudinal slots cut into its forward end so that a portion of said socket is in the form of a series of radially flexible strips, said socket also having a pair of diametrically opposed openings cut into its center portion; said second portion of said socket deforming means comprises a cylindrical member including a plurality of inwardly arched, circumferentially spaced, longitudinally extending, elastically deformable leaf springs placed around said socket in coaxial alignment therewith; and said control means comprises a base member rigidly connecting the rear ends of all of said leaf springs and having a pair of inwardly extending tabs, each of which extends through a respective one of said diametrically opposed socket openings into the volume enclosed by said socket so as to be disposed in said path over which the plug will travel during insertion.

7. Electrical connector as recited in claim 4 wherein said socket, said second portion of said socket deforming means and said elastic restoring means are constituted by a unitary element comprising a pair of laterally displaced arms forming a plug-receiving channel of indefinite width perpendicular to its lateral dimension, each of said arms having a longitudinal dimension which is mutually perpendicular to both said lateral dimension and said width, and each of said arms having a longitudinally forward portion near the region where said cavity communicates with the region outside said housing, and a rear portion removed therefrom; said forward portion being laterally flexible and forming said socket and said second portion of said socket deforming means, and said rear portion being curved laterally outwardly with respect to said forward portion and forming said elastic restoring means.

8. Electrical connector as recited in claim 4, wherein said socket and said second portion of said socket deforming means comprise at least one unitary, longitudinally extending arm which is curved so as to be convex towards the interior of said cavity.

9. Electrical connector as recited in claim 8 wherein a portion of said arm is folded with respect to the portion constituting said socket and said second portion of said socket deforming means and bears against the base of said cavity, said folded means constituting said elastic restoring means.

References Cited by the Examiner

UNITED STATES PATENTS

| 1,990,687 | 10/1931 | Godare. | |
| 2,087,538 | 7/1937 | Godare | 339—259 X |
| 2,666,189 | 1/1954 | Cook | 339—259 X |
| 2,711,523 | 6/1955 | Willis | 339—253 |
| 3,122,408 | 2/1964 | Laszczewski | 339—273 |

FOREIGN PATENTS

| 182,150 | 5/1955 | Austria. |
| 793,658 | 11/1935 | France. |
| 803,001 | 10/1958 | Great Britain. |

EDWARD C. ALLEN, *Primary Examiner.*

P. TEITELBAUM, *Assistant Examiner.*